(12) United States Patent
Keefover et al.

(10) Patent No.: US 7,191,754 B2
(45) Date of Patent: Mar. 20, 2007

(54) POSITION SENSOR APPARATUS AND METHOD

(75) Inventors: Robert D. Keefover, Lake Orion, MI (US); Michael J. Halsig, Warren, MI (US); Hal E. Pringle, Bloomfield, MI (US)

(73) Assignee: BorgWarner Inc., Auburn Hills, MI (US)

( * ) Notice: Subject to any disclaimer, the term of this patent is extended or adjusted under 35 U.S.C. 154(b) by 33 days.

(21) Appl. No.: 11/029,730

(22) Filed: Jan. 5, 2005

(65) Prior Publication Data

US 2005/0183695 A1  Aug. 25, 2005

Related U.S. Application Data

(63) Continuation-in-part of application No. 10/383,194, filed on Mar. 6, 2003.

(60) Provisional application No. 60/362,032, filed on Mar. 6, 2002.

(51) Int. Cl.
  *F02D 9/08* (2006.01)
  *F02D 11/10* (2006.01)
(52) U.S. Cl. .................. 123/337; 123/399; 251/305
(58) Field of Classification Search ............... 123/399, 123/361, 337, 520, 568.21; 251/305; 324/207.15
See application file for complete search history.

(56) References Cited

U.S. PATENT DOCUMENTS

| | | | |
|---|---|---|---|
| 4,392,375 A | 7/1983 | Eguchi et al. | |
| 4,503,391 A | 3/1985 | Hinke | |
| 5,055,781 A | 10/1991 | Sakakibara et al. | |
| 5,300,882 A * | 4/1994 | Barros ............... | 324/207.17 |
| 5,490,431 A | 2/1996 | O'Mahony et al. | |
| 5,528,139 A | 6/1996 | Oudet et al. | |
| 5,532,585 A | 7/1996 | Oudet et al. | |
| 5,544,000 A | 8/1996 | Suzuki et al. | |
| 5,681,990 A | 10/1997 | Hampo et al. | |
| 5,738,072 A * | 4/1998 | Bolte et al. .............. | 123/399 |
| 5,789,917 A | 8/1998 | Oudet et al. | |
| 5,868,114 A * | 2/1999 | Kamimura et al. ......... | 123/399 |
| 6,043,644 A * | 3/2000 | de Coulon et al. ..... | 324/207.18 |
| 6,166,535 A | 12/2000 | Irle et al. | |

(Continued)

FOREIGN PATENT DOCUMENTS

EP  1 061 341 A2  12/2000

(Continued)

*Primary Examiner*—Hai Huynh
(74) *Attorney, Agent, or Firm*—Warn, Hoffmann, Miller & LaLaone, P.C.; Greg Dziegielewski (57) ABSTRACT

A control system having a housing with a bore formed within the housing. A valve member is associated with the bore for controlling the passage of a fluid medium through the bore. An induction sensor is aligned with the valve and facilitates determining the valve position. An inductor is connected to an end of the valve member that is in close proximity to the induction sensor. It is contemplated that this control system can be used in a number of different applications including throttle control systems, turbo actuators, canister purge systems and shift control mechanisms. However, it is within the scope of this invention to incorporate the control system on virtually any type of vehicle system where it is possible to determine the position of a valve utilizing induction sensor technology.

32 Claims, 9 Drawing Sheets

U.S. PATENT DOCUMENTS

| | | | |
|---|---|---|---|
| 6,166,655 A * | 12/2000 | Chen et al. | 340/870.31 |
| 6,236,199 B1 | 5/2001 | Irle et al. | |
| 6,255,810 B1 | 7/2001 | Irle et al. | |
| 6,288,534 B1 | 9/2001 | Starkweather et al. | |
| 6,289,874 B1 | 9/2001 | Keefover | |
| 6,304,076 B1 * | 10/2001 | Madni et al. | 324/207.17 |
| 6,366,078 B1 | 4/2002 | Irle et al. | |
| 6,384,597 B1 | 5/2002 | Irle et al. | |
| 6,384,598 B1 | 5/2002 | Hobein et al. | |
| 6,407,543 B1 | 6/2002 | Hagio et al. | |
| 6,480,805 B1 | 11/2002 | Irle et al. | |
| 6,483,295 B2 | 11/2002 | Irle et al. | |
| 6,483,296 B1 | 11/2002 | Hamaoka et al. | |
| 6,491,019 B1 | 12/2002 | Apel | |
| 6,498,479 B1 * | 12/2002 | Hamaoka et al. | 324/207.2 |
| 6,499,461 B2 | 12/2002 | Kubota et al. | |
| 6,522,128 B1 * | 2/2003 | Ely et al. | 324/207.17 |
| 6,543,417 B2 | 4/2003 | Tanaka et al. | |
| 6,591,809 B2 | 7/2003 | Saito et al. | |
| 6,593,730 B2 | 7/2003 | Zapf | |
| 6,642,711 B2 | 11/2003 | Kawate et al. | |
| 6,683,429 B2 * | 1/2004 | Pringle et al. | 318/466 |
| 6,701,892 B2 | 3/2004 | Wayama et al. | |
| 6,725,833 B1 | 4/2004 | Irihune et al. | |
| 6,731,107 B2 | 5/2004 | Reverdy | |
| 6,739,312 B2 * | 5/2004 | Komeda et al. | 123/337 |
| 6,883,494 B2 * | 4/2005 | Kurita et al. | 123/337 |
| 6,886,800 B2 * | 5/2005 | Fauni | 251/129.11 |
| 6,985,018 B2 * | 1/2006 | Madni et al. | 327/176 |
| 6,997,438 B2 * | 2/2006 | Fauni | 251/305 |
| 7,028,979 B2 * | 4/2006 | Fauni | 251/129.12 |
| 7,032,569 B2 * | 4/2006 | Ikeda et al. | 123/399 |
| 7,064,508 B2 * | 6/2006 | Keefover et al. | 318/434 |
| 2002/0030488 A1 | 3/2002 | Ito | |
| 2005/0092955 A1 * | 5/2005 | Piciotti et al. | 251/305 |

FOREIGN PATENT DOCUMENTS

| | | |
|---|---|---|
| EP | 1 267 057 A2 | 12/2002 |

* cited by examiner

POSITION SENSOR APPARATUS AND METHOD

CROSS-REFERENCE TO RELATED APPLICATIONS

This application is a continuation-in-part of U.S. patent application Ser. No. 10/383,194 filed Mar. 6, 2003, which claims the benefit of U.S. Provisional Application No. 60/362,032, filed Mar. 6, 2002. The disclosures of the above applications are incorporated herein by reference.

FIELD OF THE INVENTION

The present invention generally relates to electronic throttle control systems and more particularly to electronic throttle control systems having non-contacting position sensors.

BACKGROUND OF THE INVENTION

Traditional engine fuel control systems use a mechanical linkage to connect the accelerator pedal to the throttle valve. Engine idle speed is then controlled by a mechanical system that manipulates the pedal position according to engine load.

Since the mid-1970's electronic throttle control or "drive-by-wire" systems have been developed. Electronic throttle control systems replace the mechanical linkage between the accelerator pedal and the throttle valve with an electronic linkage. These types of systems have become increasingly common on modern automobiles.

Generally, at least one sensor is typically placed at the base of the accelerator pedal and its position is communicated to the engine controller. At the engine, a throttle position sensor and an electronically controlled motor then regulate the throttle to maintain a precise engine speed through a feedback system between the throttle position sensor and the electronically controlled motor. An example of an electronic throttle control system can be found with reference to U.S. Pat. No. 6,289,874 to Keefover, the entire specification of which is incorporated herein by reference.

In conventional electronic throttle control systems, the various components of the throttle position sensor stator and connector assembly are mounted to the casting of the throttle body. The connector assembly is also connected to the motor. The throttle position sensor is placed in close proximity with the rotating shaft of the throttle valve. The throttle position sensor used to provide data so that the angular position of the throttle valve can be determined. Typical conventional throttle control systems use contact sensors such as potentiometers as well as non-contact sensors such as Hall Effect sensors which incorporate a magnet and stator configuration. These conventional sensors can often be bulky and difficult to align during assembly. Furthermore, angular position sensors have been incorporated with applications other than throttle control valves. For example, angular position sensors may be used in conjunction with other systems such as turbo actuators and exhaust gas recirculation valves, canister purge valves and transmission shift valves.

SUMMARY OF THE INVENTION

In accordance with the general teachings of the present invention, a new and improved electronic throttle control system is provided.

A control system having a housing with a bore formed within the housing. A valve member is associated with the bore for controlling the passage of a fluid medium through the bore. An induction sensor is aligned with the valve and facilitates determining the valve position. An inductor is connected to an end of the valve member that is in close proximity to the induction sensor. It is contemplated that this control system can be used in a number of different applications including throttle control systems, turbo actuators, canister purge systems and shift control mechanisms. However, it is within the scope of this invention to incorporate the control system on virtually any type of vehicle system where it is possible to determine the position of a valve utilizing induction sensor technology.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
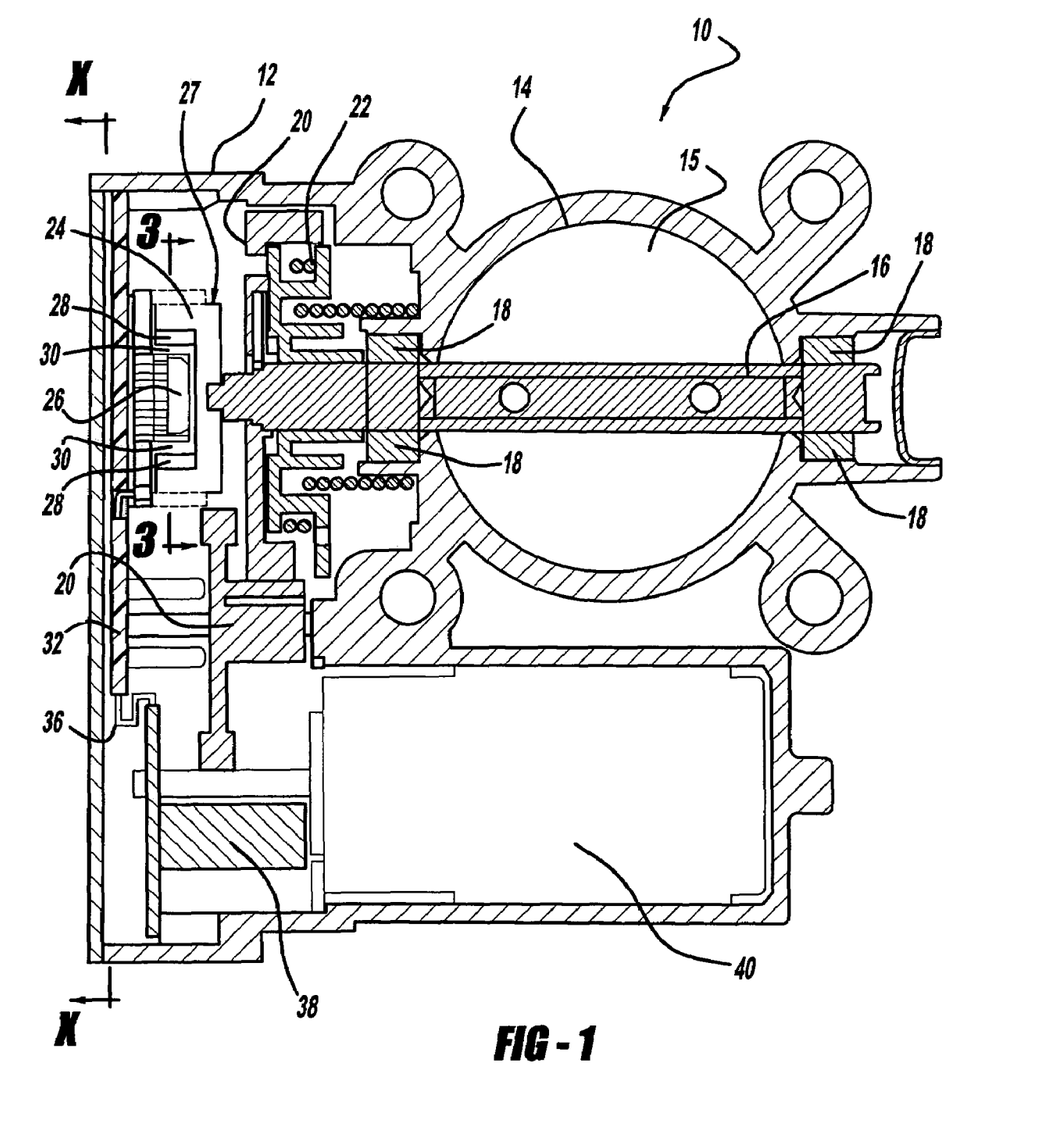
FIG. 1 is a cross-sectional view of an electronic throttle control system, in accordance with the general teachings of the present invention.

Referring to FIG. 1 there is generally shown an electronic throttle control system 10, in accordance with the general teachings of the present invention.

The system 10 generally includes a casting 12 that serves as a housing or support for the various components of the system. Formed within the casting 12 is a throttle bore 14 having a throttle plate 15 rotatably disposed inside the throttle bore 14. A throttle shaft 16 is attached to and extends across the throttle plate 15 and together the throttle plate 15 and throttle shaft 16 form an actuator that controls the flow of fluid medium through the throttle bore 14. The actuator can take other forms and the use of a throttle plate 15 and throttle shaft 16 in no way is intended to limit the scope of this invention. The throttle shaft 16 rotates the throttle plate 15 between the open and closed positions. The throttle shaft 16 is supported on both ends by a pair of bearings 18 to aid in the rotation of the throttle plate 15 and throttle shaft 16. At one end of the throttle shaft 16, a gear train 20 envelops the throttle shaft for effecting movement of the throttle shaft 16. Additionally, a spring system 22 is also provided at one end of the throttle shaft 16 as part of a fail-safe system (not shown).

At the extreme end of the throttle shaft 16, a substantially U-shaped sensor rotor 24 is fastened thereto. Although the rotor 24 is shown as being substantially U-shaped, it should be appreciated that the rotor 24 may be configured in any number of shapes, including but not limited to a cylindrical or flat member. The rotor 24 is preferably nested in close proximity to sensor stator 26 and together the two generally form a sensor assembly 27. Thus, it should be appreciated that the rotor 24 is capable of rotating about the stator 26. Although the stator 26 is shown as being substantially U-shaped, it should be appreciated that the stator 26 may be configured in any number of shapes, including but not limited to a flat member.

The axial position of the rotor 24 is preferably maintained by controlling the axial position at which it is attached to the throttle shaft 16; however, this position can be fixed or adjustable.

The stator 26 is fastened to a printed circuit board 32, which is preferably fastened to the housing 12. Axial position control is preferably maintained by attaching the printed circuit board 32 to a controlled fixed surface such as the casting 12. Tight radial position control is preferably maintained between the rotor 24 and the stator 26 through the assembly process or through dimensional control of the printed circuit board 32 and a fixed surface such as the casting 12. This tight radial positioning is preferably maintained by carrying out an alignment method which may incorporate an alignment means. One method of alignment involves the use of pre-molded slots (depicted in FIG. 2) in the casting so each of the individual components can be aligned by sliding into the slots. A second method of alignment (depicted in FIGS. 4, 4a, 4b) uses an alignment tool to hold the stator and printed circuit board in place. And yet a third method of alignment (depicted in FIG. 5.) use of tapered pins 50 that are inserted between the stator and rotor during attachment of the printed circuit board to the casting. Each of these alignment means will be described in greater detail later in this description.

The printed circuit board 32 and the stator 26 are preferably fastened in place by one or more fasteners (not shown) that are inserted through one or more apertures 34 formed on the surface of the casting 12 adjacent to the printed circuit board 32.

Fastened to the printed circuit board 32 is a preferably flexible interconnect 36 that electrically connects the printed circuit board 32 to a connector 38. The flexible interconnect 36 reduces stress on the printed circuit board 32 and allows the printed circuit board 32 to be positioned separately from the connector 38. The connector is preferably fastened to the casting 12. The connector 38 is in turn electrically connected to a motor 40 which is preferably fastened to the casting 12. Several types of motors may be within the scope of this invention. For instance the motor may be a brush motor, a DC motor, a brushless motor, a solenoid, pneumatic or a stepper motor. Any type of actuator that can facilitate the rotation of the shaft 16 may be implemented.

Figure 2:
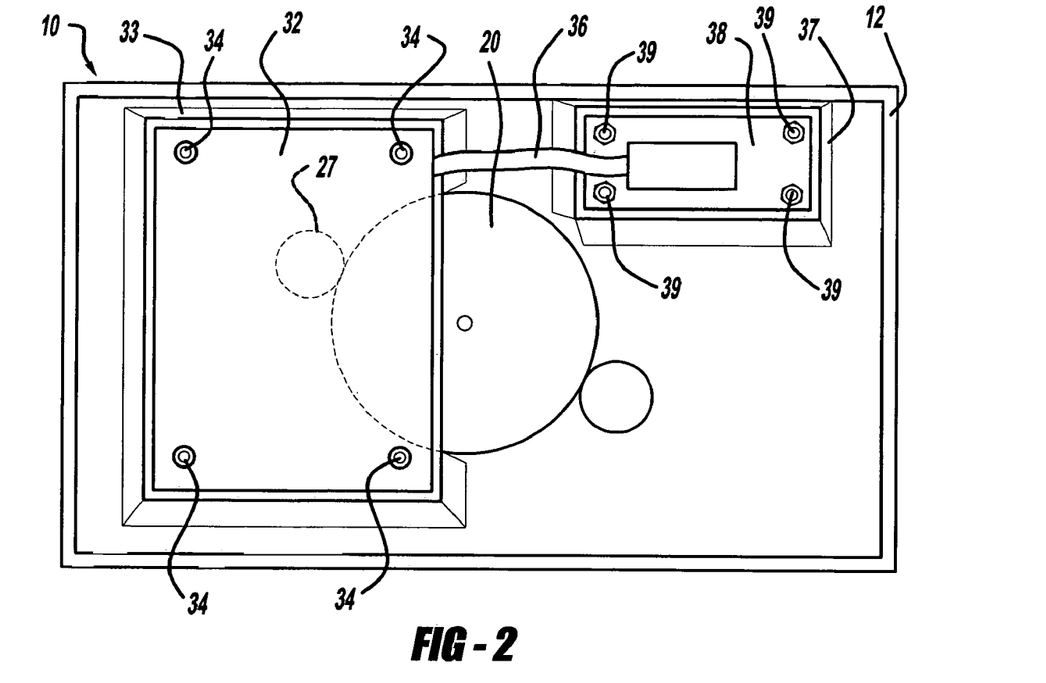
FIG. 2 is a cross-sectional side plan view taken about section line X—X of FIG. 1, however, this particular view also depicts a pre-molded casting that serves as one method of alignment during assembly of the electronic throttle control system.

FIG. 2 is a cross-sectional side plan view taken about section line X—X of FIG. 1, however, this particular view also depicts a pre-molded casting that serves as one method of alignment during assembly of the electronic throttle control system. As shown the electronic throttle control system 10 has a casting or housing 12 which houses all of the individual components of the system. The printed circuit board 32 and the electrical connector 38 are each independently mountable to the casting 12. This is accomplished through the use of a flexible interconnect which connects the printed circuit board 32 and the electrical connector 38. The flexible interconnect allows signals to be communicated between the electrical connector 38 and the sensor assembly 27 and is capable of bending or flexing to accommodate for a range of varying spatial distribution between the printed circuit board 32 and the electrical connector 38. One of the main advantages of this feature is that during assembly it is important to maintain proper air gap between the rotor and the stator so that the sensor will function properly. The flexible interconnect 36 allows the printed circuit board 32, which is fastened to the stator (not shown), to be independently and perfectly aligned with the rotor and the valve shaft, while still allowing for the electrical connector 38 to be independently aligned and connected to the casting. Not only does this feature provide an advantage during assembly of the electronic throttle control system 10 it also compensates for thermal expansion among the various components of the system 10. For example, thermal expansion can occur unevenly among each of the components of the system 10. It is possible for thermal expansion to occur in the printed circuit board region 32 before it occurs at the electrical connector 38. While actual movement caused by thermal expansion is relatively small, it can cause misalignment or changes in the air gap space between the stator and rotor thus affecting the performance of the sensor assembly 27.

As mentioned above, FIG. 2 illustrates one particular method of aligning the electrical connector 38 and the printed circuit board 32. The casting 12 of this particular embodiment has pre-molded alignment depressions. The printed circuit board 32 and sensor assembly 27 can be aligned by placing the printed circuit board 32 within a board depression 33. Once the printed circuit board 32 is aligned it can be fastened to the housing 12 with fasteners 34. The electrical connector 38 can then be aligned by placing the electrical connector 38 within a connector depression 37. Once the electrical connector 38 is aligned it can then be fastened to the housing 12 with fasteners 39.

Figure 3:
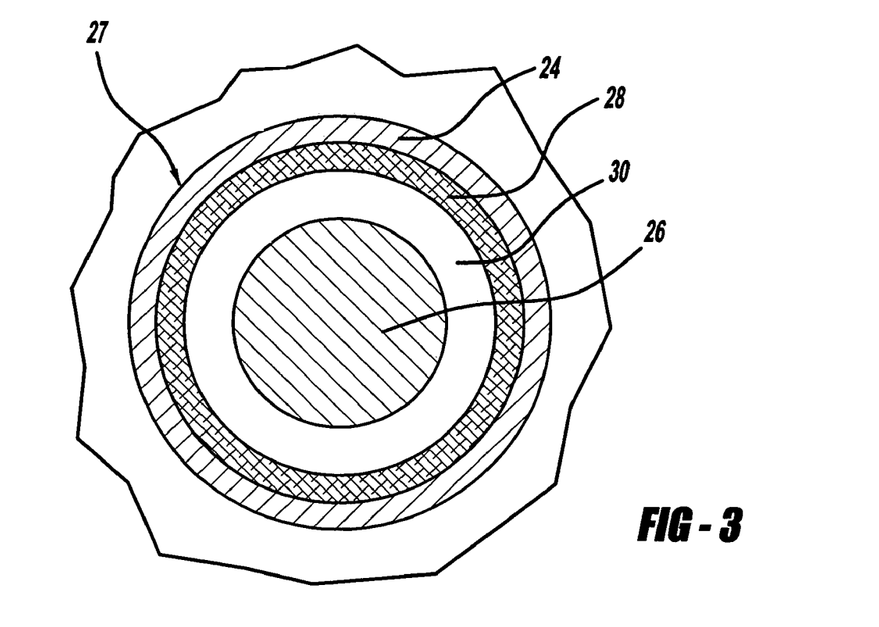
FIG. 3 is a cross-sectional plan view of the sensor assembly taken about section line 3—3 on FIG. 1.

FIG. 3 is a cross-sectional plan view of the sensor assembly 27 taken about section line 3—3 on FIG. 1. The sensor assembly 27 consists of a sensor rotor 24, a sensor stator 26, a magnet layer 28 and an air gap 30. As shown the sensor stator 26 is disposed inside of a nested region of the sensor rotor 24. Disposed on the surface of the sensor rotor 24 is a magnet layer 28. The sensor rotor 24 and sensor stator 26 are positioned so they are not touching and there will be an air gap 30 between the surface of the sensor stator 26 and the magnet 28 layer on the surface of the sensor rotor 24. A sensor assembly of this type is generally referred to as a non-contact sensor, such as a Hall Effect sensor. Examples of prior art Hall Effect sensors are known in the art and can be found with reference to U.S. Pat. No. 5,528,139 to Oudet et al., U.S. Pat. No. 5,532,585 to Oudet et al., and U.S. Pat. No. 5,789,917 to Oudet et al., the entire specifications of which are incorporated herein by reference. However, it is possible for the sensor assembly to incorporate other non-contact or contact sensors that require precise alignment of the sensor assembly.

Figure 4:
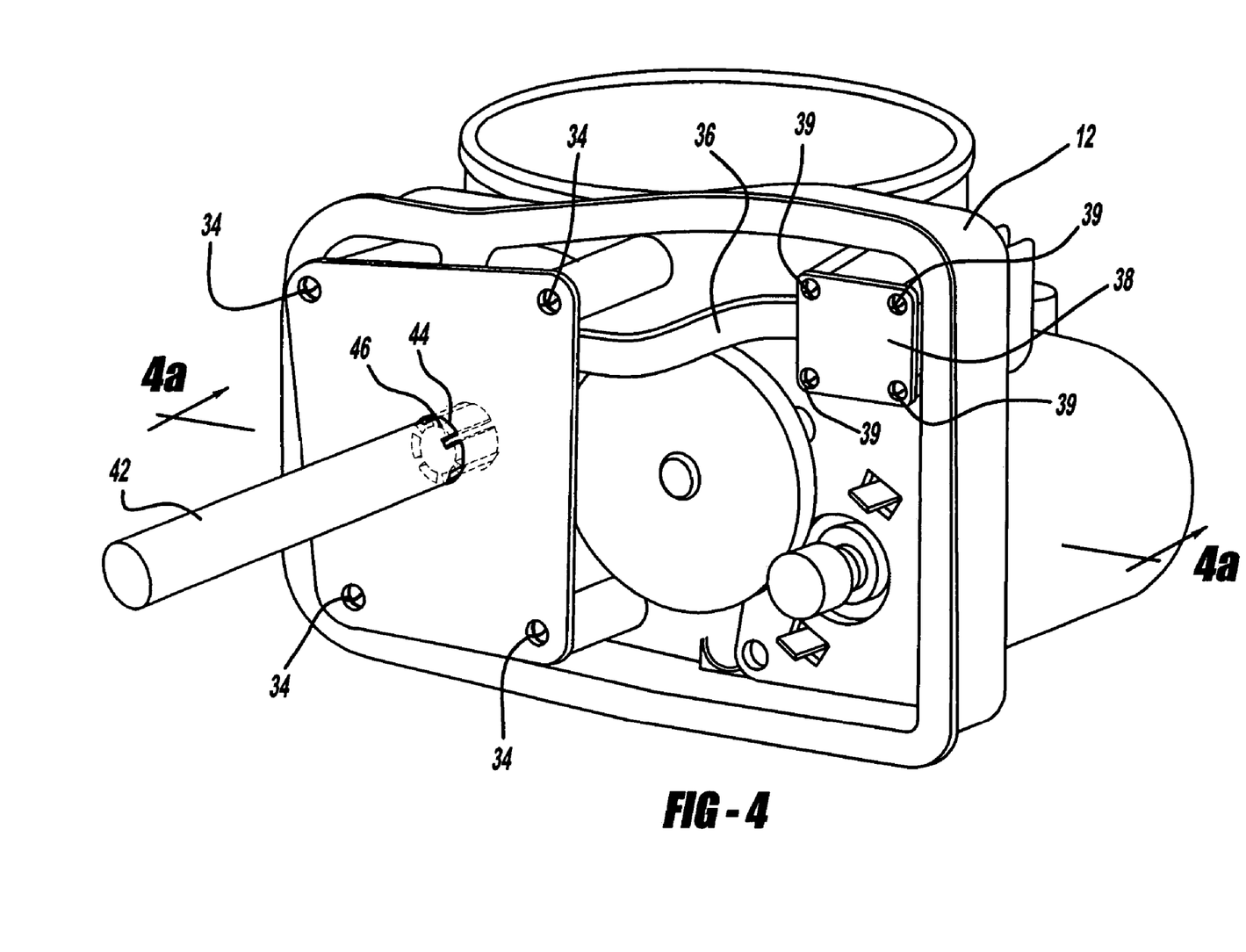
FIG. 4 depicts a perspective view of the throttle control system taken about section line X—X in FIG. 1, wherein this particular view depicts the use of an alignment tool that is used to align the sensor assembly during assembly of the throttle control system.

FIG. 4 depicts a perspective view of the throttle control system taken about section line X—X in FIG. 1, wherein this particular view depicts the use of an alignment tool 42 that is used to align the sensor assembly 27 during assembly of the throttle control system 10. As can be seen, the printed circuit board 32 has a number of slots 44 on its surface which defined the perimeter of the sensor stator 26. The slots 44 allow the insertion of an alignment tool 42 which is used to engage the printed circuit board 32 and the sensor stator 26 so that the printed circuit board 32 and the sensor stator 26 can be properly aligned in relation to the sensor rotor (not shown) during assembly.

After the sensor stator is properly aligned the printed circuit board 32 can be fastened to the casting 12 with fasteners 34. Once the printed circuit board 32 is secure the alignment tool 42 can be disengaged since the sensor stator 26 is not in proper alignment. After securing the printed circuit board 32 and the sensor assembly (not shown) the electrical connector 38 can be aligned and fastened 39 to the casting 12. The flexible interconnect 36 allows electrical connector 38 and the printed circuit board 32 to be assembled independent of each other so that the sensor stator 26 does not become misaligned during completion of assembly.

The alignment tool 42 in this embodiment has six fingers 46 that align with the slots 44. The fingers 46 on the alignment tool 42 are flexible and are capable of bending to grasp onto the sensor stator 26. Once the printed circuit board 32 is fastened to the casting 12, the alignment tool 42 can be easily removed by simply pulling the alignment tool 42 away from the printed circuit board 32.

Figure 4A:
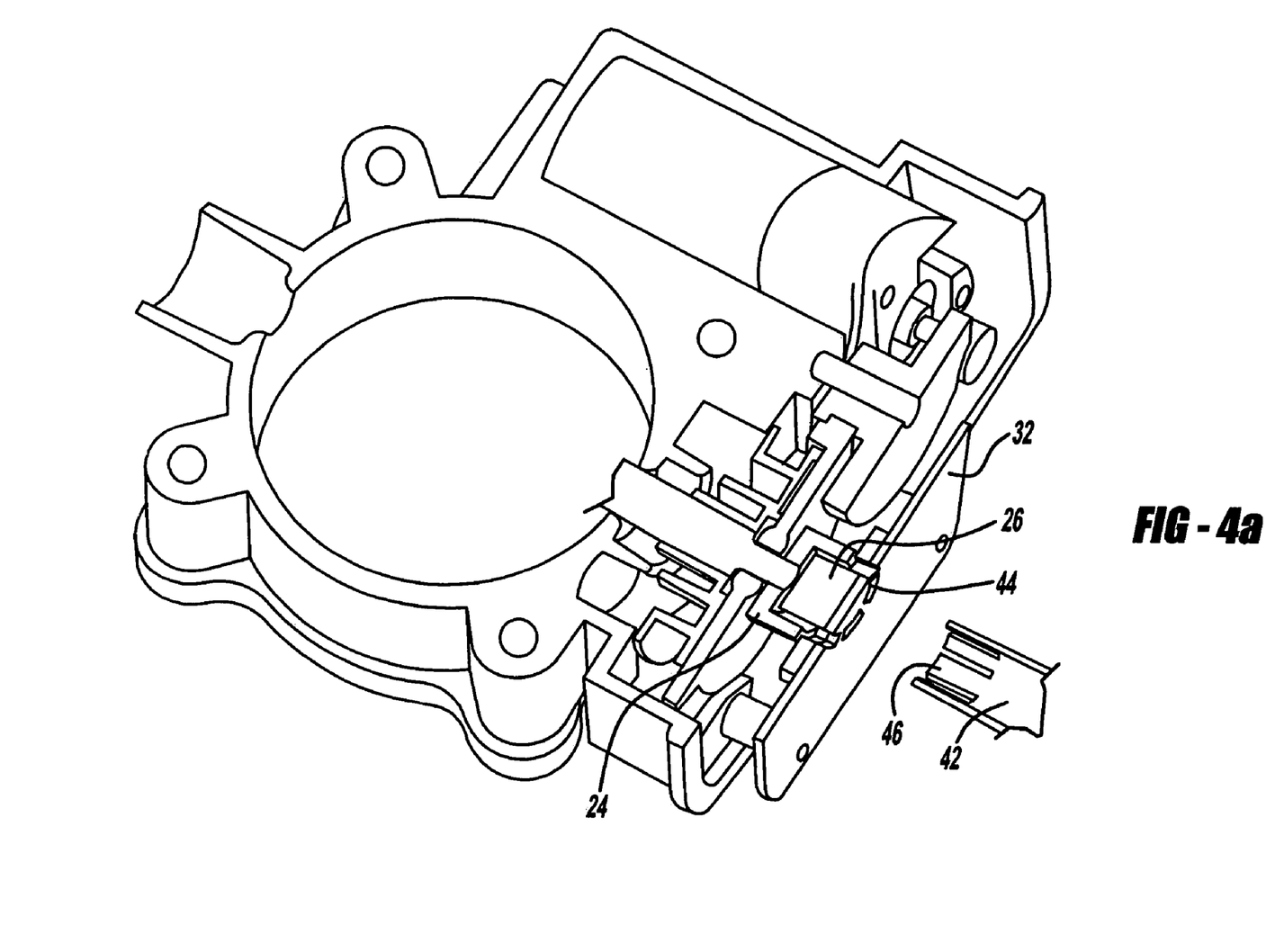
FIG. 4a is a cross-sectional view taken about section line 4a—4a of FIG. 5.
Figure 5:
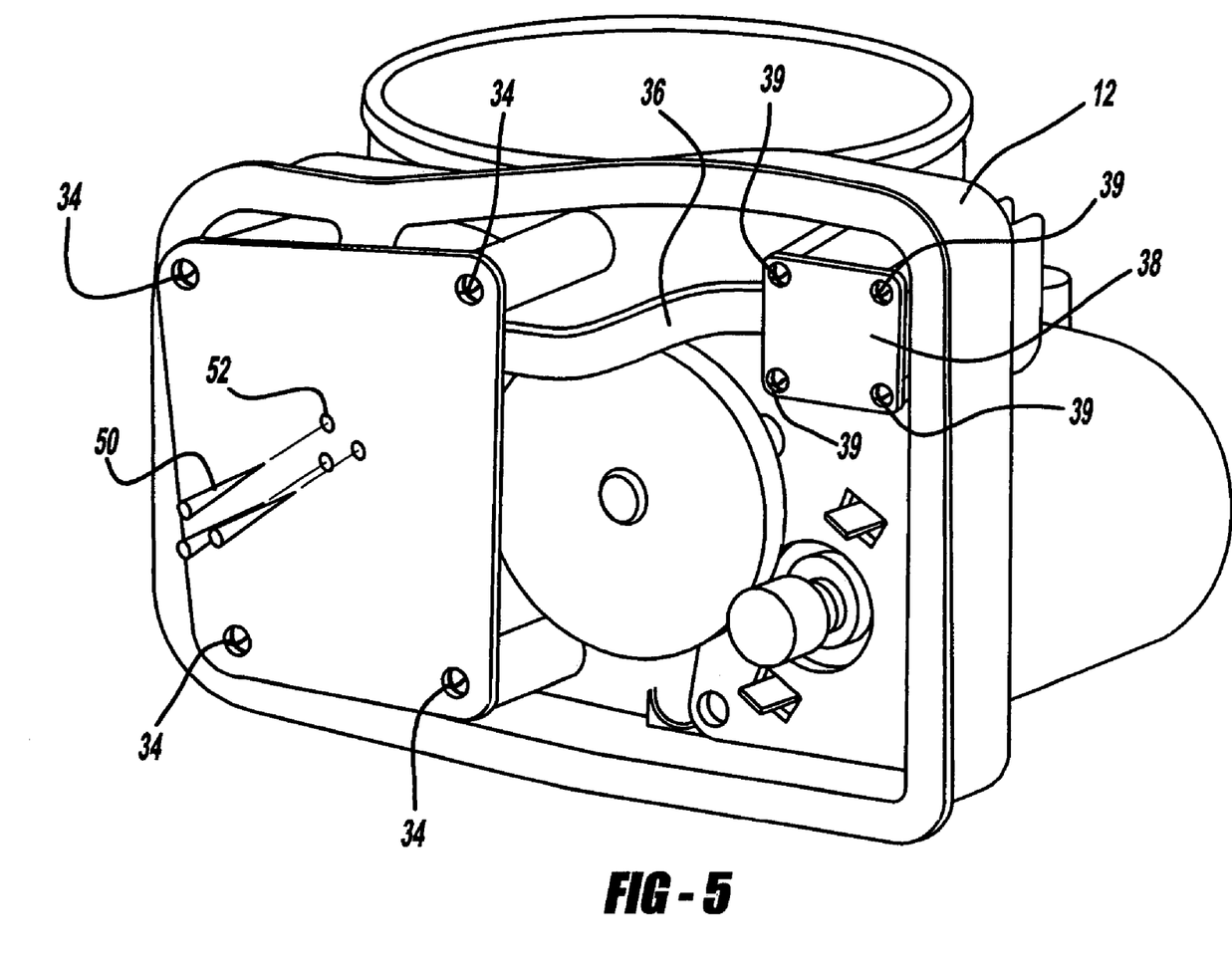
FIG. 5 depicts a perspective view taken about section line X—X of FIG. 1, however, this particular embodiment incorporates the use of alignment holes that are used as an alternate to the alignment slots.

FIG. 4a is a cross-sectional view taken about section line 4a—4a of FIG. 5. The sensor stator 26 is connected to the printed circuit board 32 and the alignment tool 42 is used to position the sensor stator 26 in the nested region of the rotor 24. Once the printed circuit board 32 is fastened to the casting 12, alignment of the sensor stator 26 and the sensor rotor 24 will be maintained and the alignment tool 42 may be removed.

Figure 4B:
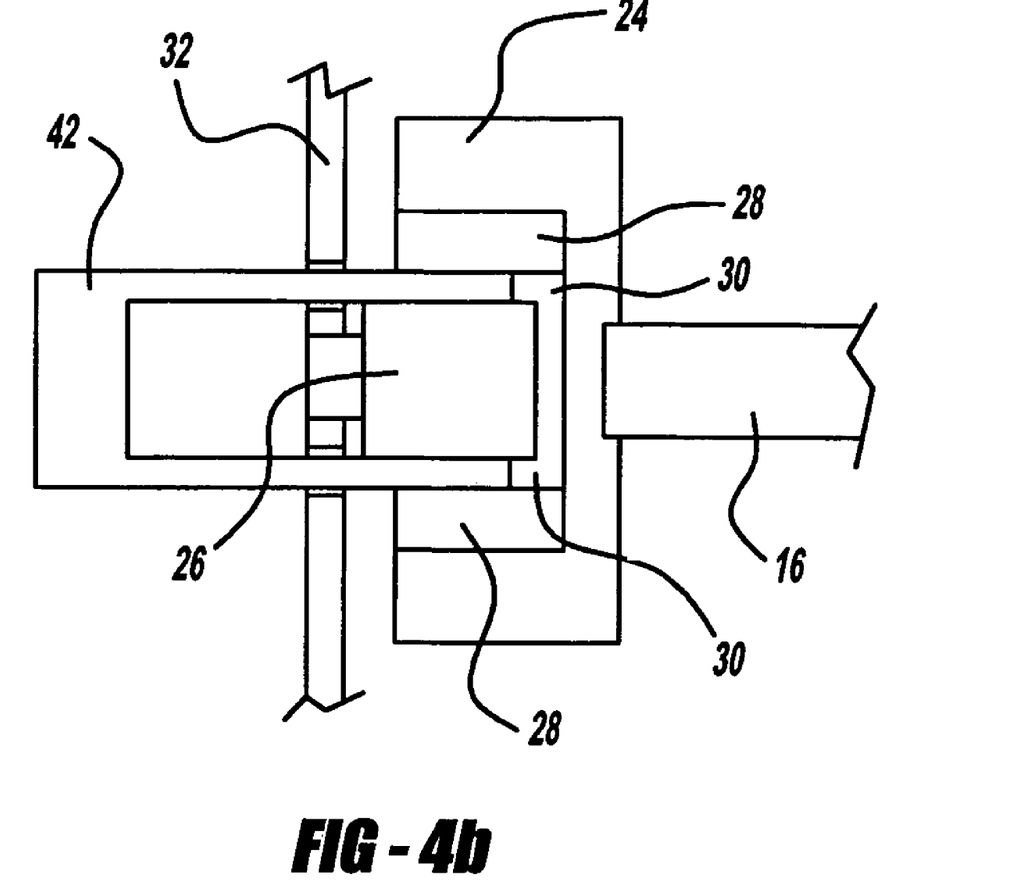
FIG. 4b is a cross-sectional view of the sensor assembly being aligned using the alignment tool.

FIG. 4b is a cross-sectional view of the sensor assembly being aligned using the alignment tool. The rotor alignment tool 42 can have various configurations. The stator 26 can be positioned at the tip of the rotor alignment tool 42 and can be temporarily engaged to the tip of the rotor alignment tool 42 by pressing the stator 26 onto the tool. The tool 42 can then be used to align the stator 26 and the rotor 24 so that a proper air gap 30 is achieved. The tips of the tool 42 help aid in forming the proper air gap by holding the stator in place during fastening.

FIG. 5 depicts a perspective view taken about section line X—X of FIG. 1, however, this particular embodiment incorporates the use of alignment holes 52 that are used as an alternate to the alignment slots. During assembly and alignment of the printed circuit board 32 and stator 26 with respect to the magnet 28 and rotor 24, individual tapered pins 50 are inserted through the alignment holes 52 in a manner similar to the alignment tool 42 depicted in FIG. 5. The tapered pins 50 are used to align the sensor stator 26 with respect to the magnets 28 of the rotor 24 so that a properly spaced air gap 30 is created during assembly. Once the printed circuit board 32 is fastened to the casting 12 the tapered pins 50 are then removed. In this particular embodiment of the invention the pins 50 are tapered to prevent over-insertion and ease the insertion and retraction of the pins 50, however, it is possible to use pins 50 of virtually any type of configuration.

Once the printed circuit board 32 is fastened to the casting the electrical connector 38 can also independently be aligned and fastened to the casting 12. Once again the flexible interconnect 36 plays an important role by allowing the electrical connector 38 and the printed circuit board 32 to each be aligned and fastened to the casting 12 independently of each other. This eliminates the possibility of misalignments of the sensor assembly 27 when the electrical connector 38 is connected to the casting. Additionally, as stated earlier the use of the flexible interconnect 36 also prevents misalignment of the sensor assembly 27 during thermal expansion which may occur during normal operation of the throttle control system 10.

In operation, the present invention functions by employing feedback between the various sensor systems (e.g., sensor rotor/sensor stator) and the various control assemblies (e.g., the motor) in order to properly position the throttle plate so as to achieve optimal performance of the electronic throttle control system. The present invention can be employed in any type of rotary actuator employing a position sensor.

Figure 6:
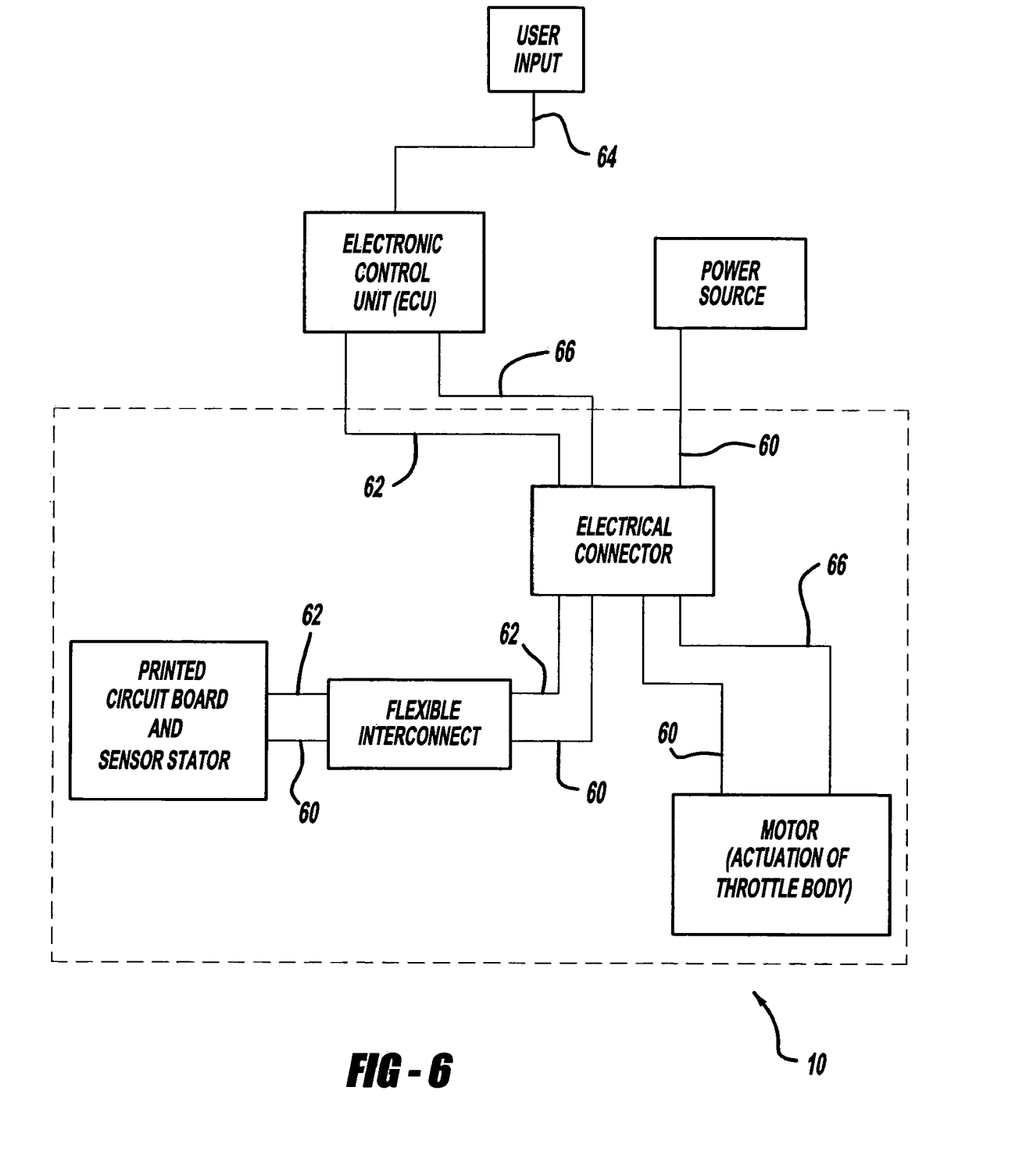
FIG. 6 depicts a schematic view of the operation of the throttle control system.

FIG. 6 depicts a schematic view of the operation of the throttle control system. The throttle control system 10 operates using an external electrical control unit (ECU). The ECU is a logic circuit that receives a user input signal 64 and a throttle position signal 62 and generates a control signal 66 to the motor via the electrical connector.

The electrical connector of the throttle control system 10 also receives power 60 from a power source. The power is distributed through the electrical connector to the motor and the sensor stator via the flexible interconnect and sensor stator.

The user input signal 64 is a value that indicates the user's desired throttle position. The user input signal 64 can be generated from a user input such as, an accelerator pedal (not shown).

The throttle position signal 62 is generated by the sensor stator via the printed circuit board, the flexible interconnect and the electrical connector. The throttle position signal 62 is a value that indicates the present angular position of the throttle plate (not shown). In a preferred embodiment of the invention the throttle position signal is an analog position signal. However, it is in the scope of this invention to have a throttle position signal that is digital.

The ECU analyzes the values of the user input signal 64 and the throttle position signal 62 to determine if the throttle position signal 62 matches the user input signal 64. If the two signal values do not match then the ECU will generate a control signal 66 to the motor which is inputed to the throttle control system 10 via the electrical connector. The motor receives the control signal 66 and actuates the throttle body so that actual angular position of the throttle valve matches the desired angular position of the user which will be confirmed by the ECU when the throttle position signal 62 and the user input signal 64 both match.

The printed circuit board serves as a housing for the sensor stator 26. In a preferred embodiment of the invention, the sensor stator generates an analog to position signal that travels through wiring (not shown) on the printed circuit board. The position signal then exits the printed circuit board through the flexible interconnect and travels to the ECU via the electrical connector. The printed circuit board preferably has no logic, however, it may contain resistors, capacitors, and amplifiers necessary for the position signal. However, it should be understood that it is within the scope of this invention to incorporate a printed circuit board that has logic functions.

In addition to carrying the position signal, the flexible interconnect also supplies power from the electrical connecter to the sensor stator via the printed circuit board. In an embodiment where the printed circuit board has Logic functions it should also be understood that the flexible interconnect would also be capable of carrying a user input signal to the motor. The flexible interconnect can have many physical forms. For example, in the present embodiment the flexible interconnect may be bare metal wires, however, it is possible to use a ribbon wire or plastic coated wires in embodiments where the flexible interconnect will need to insulated.

The preferred embodiment of the invention has an external ECU. The ECU receives a position signal from the sensor stator. This signal indicates the angular position of the throttle plate. The ECU also receives a user input signal that indicates the user's desired angle of the throttle plate. The ECU takes the values of the user input signal and the position signal and generates a control signal based on the values. The control signal is sent to the motor and causes the motor to rotate the gear train, the throttle shaft and throttle plate (see FIGS. 1–2) so the throttle plate reaches the angle desired by the user.

Figure 7:
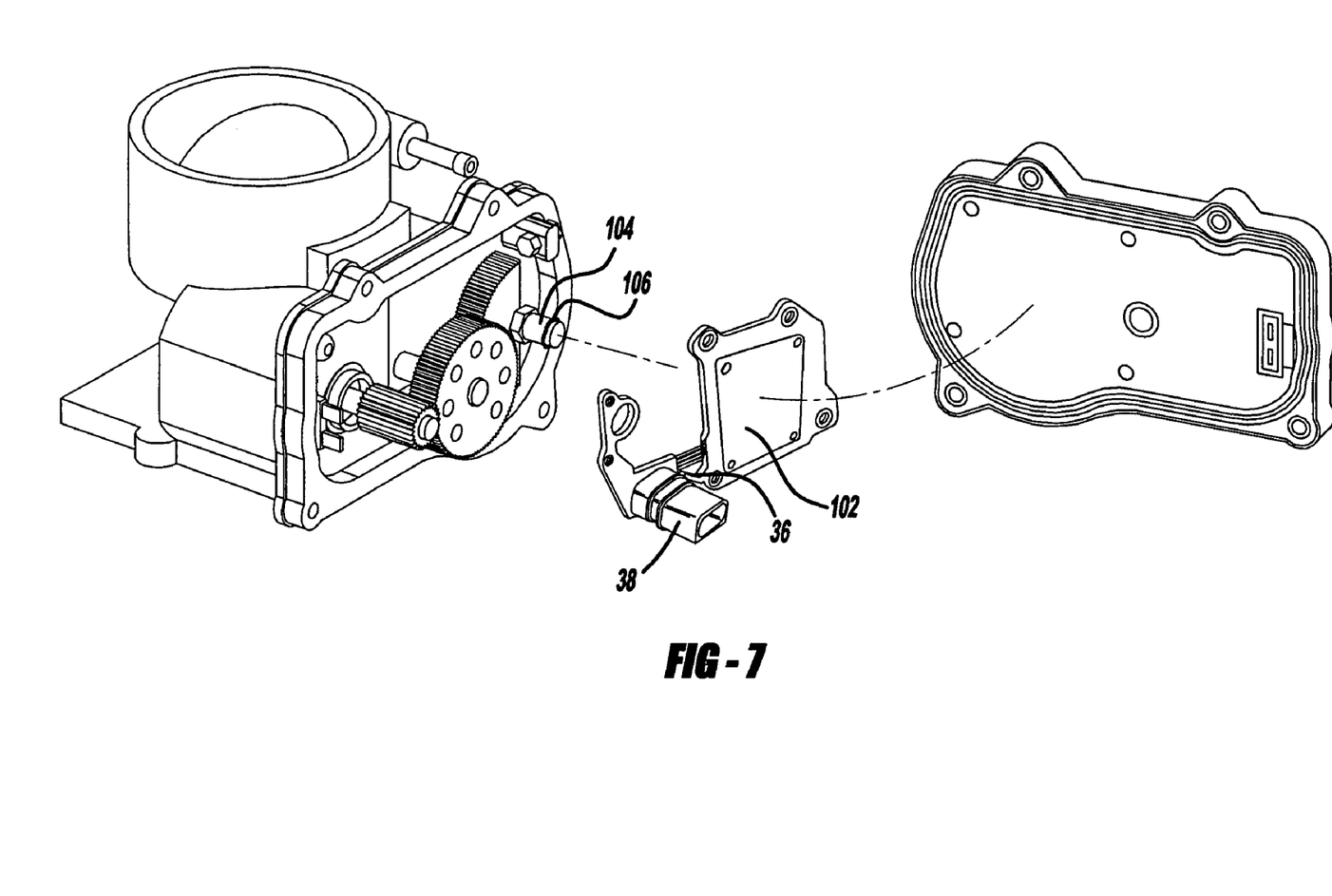
FIG. 7 is an expanded perspective view of the throttle body sensor arrangement and cover member.
Figure 8:
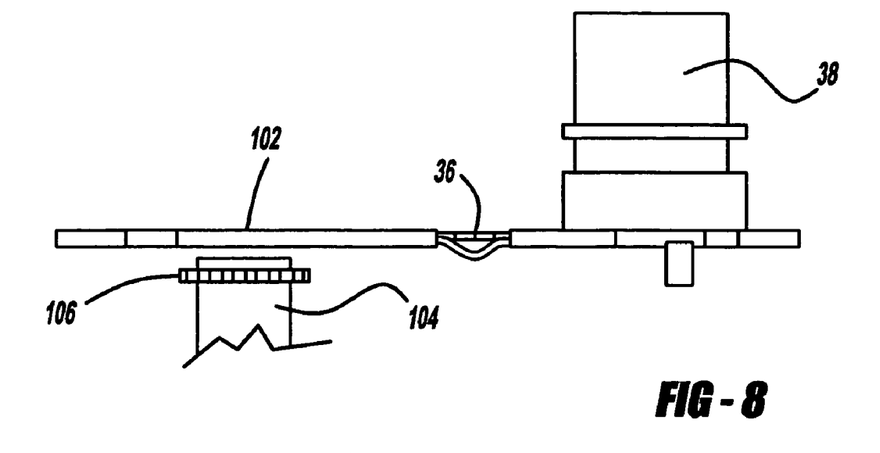
FIG. 8 is an overhead plan view of the sensor arrangement with a partial view of the throttle shaft and inductor positioned near the sensor.
Figure 9:
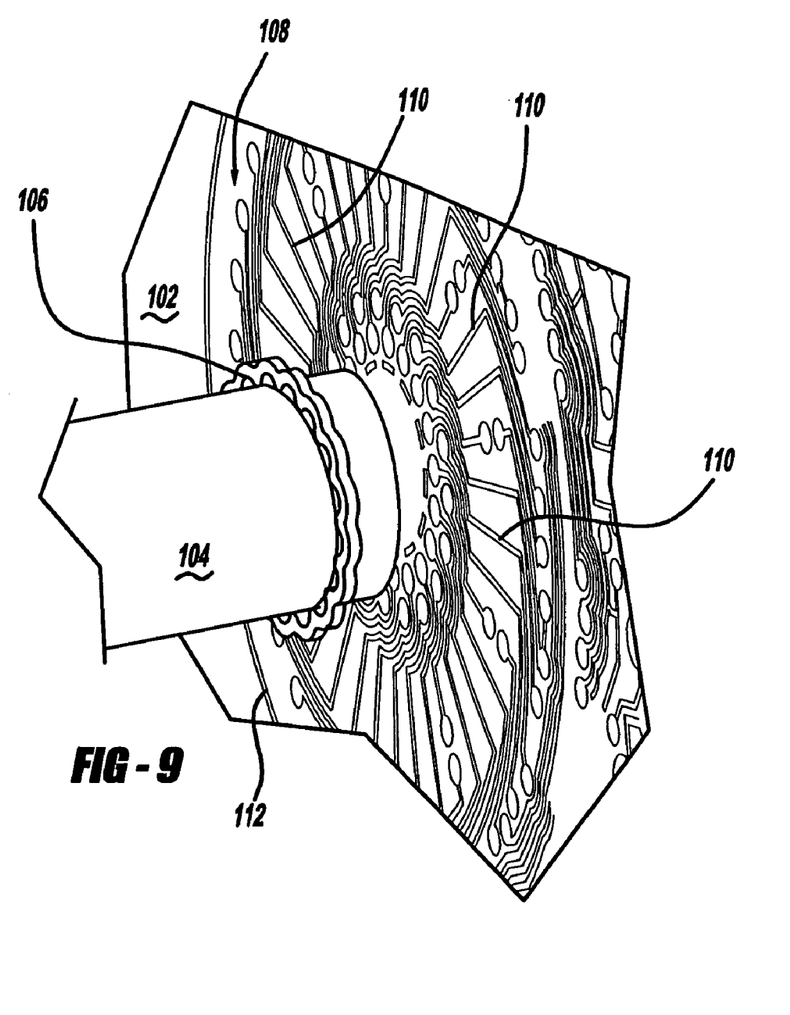
FIG. 9 is a perspective partial view of the sensor aligned with the throttle shaft and inductor.

FIGS. 7–9 depict an alternate embodiment of the invention incorporating an induction sensor. As shown in FIG. 7 there is an induction sensor 102. The induction sensor 102 is a flat sensor, however, it is within the scope of this invention for the induction sensor 102 to have some other shape depending on the spatial requirements of certain designs. The induction sensor 102 is connected to the connector 38 via the flexible interconnect 36. The flexible interconnect 36 allows the induction sensor 102 to be positioned independently from the electrical connector 38, so that proper alignment can be obtained between the sensor 102 and an inductor 106 positioned at the end of a throttle shaft 104.

FIG. 8 shows an overhead plan view of the connector 38, sensor 102 and flexible interconnect 36 positioned relative to the throttle shaft 104. The end of the throttle shaft 104 is positioned in close proximity to but does not contact the sensor 102. The inductor 106 is positioned near the end of the throttle shaft 104. The inductor 106 is in the form of a single copper loop that is bent in a sprocket-like shape.

FIG. 9 shows a close-up perspective view of the sensor 102 positioned near the throttle shaft 104 and inductor 106. The sensor 102 has two layers (not shown) of printed circuit board (PCB) 108. Three sets of two pickup coils 110 (i.e., 6 pickup coils total) traverse between the layers of printed circuit board 108. As discussed below, each set of pickup coils 110 generates a signal value that can be used to determine the position of the throttle valve 106. It is within the scope of this invention to use a greater or lesser number of pickup coils.

The induction sensor 102 operates by measuring fluxuation of a high frequency magnetic field. An activation coil 112 circumscribes the pickup coils 110. When energized, the activation coil 112 induces a high frequency magnetic field between the actuation coil 112 and the pickup coils 110, that in turn causes a secondary high frequency magnetic field to be induced between the inductor 106 and the pickup coils 110. The secondary magnetic field is strongest when the sprockets of the inductor 106 are aligned with one of the pickup coils 110. As the throttle shaft 104 rotates the secondary magnetic field between the inductor 106 and the pickup coils 110 will fluctuate as the inductor 106 is misaligned with one set of pickup coils 110 and moves into alignment with the second set of pickup coils 110. Each set of three pickup coils 110 will generate a signal from which the throttle position can be derived. As the throttle shaft 104 moves out of alignment with the first set of pickup coils 110, it will move into alignment with the second set of pickup coils 110, thus the signal values from each set of pickup coils will be inverted and have unequal slopes. As the inductor 106 is rotated in and out alignment among the various sets of pickup coils 110, the secondary magnetic field generated between the inductor 106 and a particular set of pickup coils 110 will become disrupted which in turn disrupts the high frequency magnetic field generated between the activation coil 112 in the pickup coils 110. The disruption of the magnetic field between the activation coil 112 and the pickup coils 110 is what the throttle position signal is derived from.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control system comprising:
   a housing;
   a bore formed within said housing;
   a moveable member positioned in said bore; and
   an inductor connected to an end of said moveable member.

2. The control system of claim 1 further comprising an induction sensor operably configured with said inductor.

3. The control system of claim 2 wherein said induction sensor has one or more pickup coils operably configured with respect to an activation coil.

4. The control system of claim 1 further comprising:
   a motor operably associated with said moveable member for effecting the movement of said moveable member; and
   an electrical connector having connections with said induction sensor and said motor.

5. The control system of claim 1 further comprising:
   an induction sensor operably configured with respect to said inductor;
   a connector connected to said housing; and
   a flexible interconnect connected between said induction sensor and said connector.

6. The control system of claim 1 wherein said inductor is formed of wire bent into a sprocket-like shape.

7. The control system of claim 1 further comprising an induction sensor having at least two sets of three pickup coils operable configured with respect to an activation coil.

8. The control system of claim 1 wherein said moveable member is a turbo actuator valve for controlling engine compression.

9. The control system of claim 1 wherein said moveable member is an exhaust gas recirculation valve.

10. The control system of claim 1 wherein said moveable member is a canister purge valve.

11. The control system of claim 1 wherein said moveable member is a throttle control valve.

12. A control system comprising:
a housing;
a bore formed within said housing;
a plate movably disposed within said bore;
a throttle shaft operably connected to said throttle plate for facilitating movement of said throttle plate;
an induction sensor operably aligned with said throttle shaft; and an inductor connected to an end of said throttle shaft in close proximity to said induction sensor.

13. The control system of claim 12 wherein said induction sensor has one or more pickup coils operably configured with respect to an activation coil.

14. The control system of claim 12 further comprising:
a motor operably associated with said throttle shaft for effecting the movement of said throttle shaft,
an electrical connector having connections with said induction sensor and said motor.

15. The control system of claim 12 wherein said inductor is formed of wire bent into a sprocket-like shape.

16. The control system of claim 12 wherein said induction sensor has at least two sets of three pickup coils operably configured with respect to an activation coil.

17. The control system of claim 12 wherein said electronic throttle control system is used on a turbo actuator valve for controlling engine compression.

18. The control system of claim 12 wherein said electronic throttle control system is used on an exhaust gas recirculation valve.

19. The control system of claim 12 wherein said electronic throttle control system is used on a canister purge valve.

20. The control system of claim 12 wherein said electronic throttle control system is used on a throttle control valve.

21. The control system of claim 12 further comprising:
a connector connected to said housing; and
a flexible interconnect connected between said induction sensor and said connector.

22. The control system of claim 12 further comprising:
a motor operably associated with said throttle shaft for effecting the movement of said throttle shaft; and
an electrical connector having connections with said induction sensor and said motor.

23. A control system comprising:
a housing;
a bore formed within said housing;
an actuator connected to said bore;
an induction sensor aligned with the actuator;
an inductor connected to an end of said actuator in close proximity to said induction sensor.

24. The control system of claim 23 wherein said induction sensor has one or more pickup coils operably configured with respect to an activation coil.

25. The control system of claim 23 further comprising:
a motor operably associated with said actuator for effecting the movement of said actuator,
an electrical connector having connections with said induction sensor and said motor.

26. The control system of claim 23 wherein said inductor is formed of wire bent into a sprocket-like shape.

27. The control system of claim 23 wherein said induction sensor has at least two sets of three pickup coils operably configured with respect to an activation coil.

28. The control system of claim 23 wherein said actuator is a turbo actuator for controlling engine compression.

29. The control system of claim 23 wherein said actuator is an exhaust gas recirculation valve.

30. The control system of claim 23 wherein said actuator is a canister purge valve.

31. The control system of claim 23 wherein said actuator is a throttle control valve.

32. The control system of claim 23 further comprising:
a connector connected to said housing; and
a flexible interconnect connected between said induction sensor and said connector.

* * * * *